United States Patent
Hsieh et al.

(10) Patent No.: US 10,696,383 B2
(45) Date of Patent: Jun. 30, 2020

(54) FLIGHT DEVICE

(71) Applicant: Coretronic Intelligent Robotics Corporation, Hsinchu County (TW)

(72) Inventors: Chi-Tong Hsieh, Hsin-Chu (TW); Kuan-Chou Ko, Hsin-Chu (TW); Ying-Chieh Chen, Hsin-Chu (TW); Hsu-Chih Cheng, Hsin-Chu (TW)

(73) Assignee: Coretronic Intelligent Robotics Corporation, Hsinchu County (TW)

( * ) Notice: Subject to any disclaimer, the term of this patent is extended or adjusted under 35 U.S.C. 154(b) by 386 days.

(21) Appl. No.: 15/674,374

(22) Filed: Aug. 10, 2017

(65) Prior Publication Data

US 2018/0044003 A1 Feb. 15, 2018

(30) Foreign Application Priority Data

Aug. 12, 2016 (CN) .......................... 2016 1 0659678

(51) Int. Cl.
  *B64C 39/02* (2006.01)
  *B64C 27/08* (2006.01)
  *F16B 7/18* (2006.01)
(52) U.S. Cl.
  CPC ............ *B64C 27/08* (2013.01); *B64C 39/024* (2013.01); *B64C 2201/027* (2013.01); *B64C 2201/108* (2013.01); *F16B 7/185* (2013.01)
(58) Field of Classification Search
  CPC ................................ B64C 27/08; F16B 7/185
  USPC ....................................................... 244/131
  See application file for complete search history.

(56) References Cited

U.S. PATENT DOCUMENTS

| 2015/0345673 | A1 | 12/2015 | Gannis | |
|---|---|---|---|---|
| 2017/0043870 | A1* | 2/2017 | Wu | B64C 27/08 |
| 2018/0354625 | A1* | 12/2018 | Verkade | B64D 9/00 |
| 2019/0084673 | A1* | 3/2019 | Chen | B64C 3/56 |

FOREIGN PATENT DOCUMENTS

| CN | 203681871 U | 7/2014 |
|---|---|---|
| CN | 204223176 U | 3/2015 |
| CN | 204297074 U | 4/2015 |
| CN | 204527607 U | 8/2015 |
| CN | 204895868 U | 12/2015 |
| CN | 204916180 U | 12/2015 |

* cited by examiner

*Primary Examiner* — Claude J Brown

(57) ABSTRACT

A flight device includes a device body with a surface, a plurality of arm structures disposed in the device body and a plurality of rotor modules disposed to the arm structures respectively. Each arm structure includes a fixing base, a second screw element, a connecting unit, a rod body and a position-limiting element. The fixing base is disposed in the device body and includes a first screw element having a first screw part. The second screw element has a second screw part matched with the first screw part. The connecting unit drills through the second screw element. The connecting unit is locked to the fixing base by screwing the first and second screw parts with each other. The rod body drills through the connecting unit. The position-limiting element is disposed between the second screw element and the connecting unit. The position-limiting element abuts against the second screw element.

12 Claims, 14 Drawing Sheets

FLIGHT DEVICE

CROSS-REFERENCE TO RELATED APPLICATION

THIS APPLICATION CLAIMS THE PRIORITY BENEFIT OF CN201610659678.X FIELD ON Aug. 12, 2016. THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a flight device, and more particularly to a folding mechanism for a rotor of an unmanned aerial vehicle.

BACKGROUND OF THE INVENTION

In order to adapt to different applications such as film shooting, agricultural plant protection and cargo transportation, the existing unmanned aerial vehicles (UAVs) in the market are designed to have six or even eight rotors. In this structural design, the unmanned aerial vehicles accordingly has a larger size due to the body's wheelbase is enlarged, which may result in inconvenience when storing or moving the unmanned aerial vehicles.

The rotor folding structure of the present unmanned aerial vehicle adopts, for example, a buckle type folding structure, a clip-on type folding structure or a detachable spiral arm structure. The buckle type folding structure utilizes a rotation of a buckle structure, such as clockwise or counterclockwise rotation, to achieve a position-limiting effect thereby switching the rotor between a folded state and an unfolded state. The clip-on type folding structure utilizes a clip-on structure to engage and fix the rotor arm thereby switching the rotor between a folded state and an unfolded state. The detachable spiral arm structure directly disassemblies and folds the rotor arm.

However, the above-mentioned rotor folding structure still has some problems such as insufficient fixing strength and easy to be loosened. For example, the buckle type folding structure merely tightens and fixes the rotor by means of overlapping the buckle structures and only fixes the axial position limiting, therefore, the gap will become larger and larger under the use and wear and tear for a long time. Thus, the buckle may be loosening by the vibration generated by the motor when the unmanned aerial vehicle is in flight. In addition, most of the buckle type folding structures are plastic structures; thus, the buckle is easy to be loosening when the structural fatigue, insufficient strength and wear and tear in structure occurs. The clip-on type folding structure utilizes, for example, a C-type clip-on structure to realize the fixing by overlapping the rotor arms. The C-type clip-on structure uses only a local interference to limit the rotor arm therefore cannot tightly clamp and securely fix the rotor arm. In addition, most of the C-type clip-on structures are plastic structures; thus, they also have the problems of structural fatigue and insufficient strength. The detachable spiral arm structure can effectively reduce the size of the unmanned aerial vehicle in the fold state, but the re-assembly is not only time-consuming but also may cause a higher risk that the unmanned aerial vehicle or even the rotation direction of the motor is wrong assembled. Therefore, how to improve the above-mentioned problem is the focus of attention of the related person in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a flight device having the advantages of such as high strength, rigidity and stability in structure.

Other objectives and advantages of the invention can be further illustrated by the technical features broadly embodied and described as follows.

In order to achieve one or a portion of or all of the objects or other objects, the invention provides a flight device, which includes a device body, a plurality of arm structures and a plurality of rotor modules. The device body has a surface. The arm structures are disposed in the device body respectively. Each of the plurality of arm structures includes a fixing base, a second screw element, a connecting unit, a rod body and a position-limiting element. The fixing base is disposed in the device body. The fixing base includes a first screw element. The first screw element has a first screw part. The second screw element has a second screw part matched with the first screw part. The connecting unit drills through the second screw element. The connecting unit is locked to the fixing base by screwing the first screw part and the second screw part with each other. The rod body drills through the connecting unit. The position-limiting element is disposed between the second screw element and the connecting unit. The position-limiting element abuts against the second screw element. The rotor modules are disposed to the plurality of arm structures respectively.

In summary, by locking the screw parts of the screw elements (for example, the first and second screw elements) to generate a frictional force upon locking, the flight device of the embodiment of the invention has a strong tensile strength, shear strength and fatigue strength. In addition, by utilizing the position-limiting element to fix the screw elements tightly screwed with each other, the arm structure of the flight device of the embodiment of the invention has a structure with some advantages such as less liable to slide and high tightening stability. Further, through the arm structure actuated by the position-limiting structure, the first sub-arm and the second sub-arm pivotally connected to each other, the flight device of the embodiment of the invention is easily switched from the unfolded state to the folded state and the volume of the flight device in the folded state is effectively reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
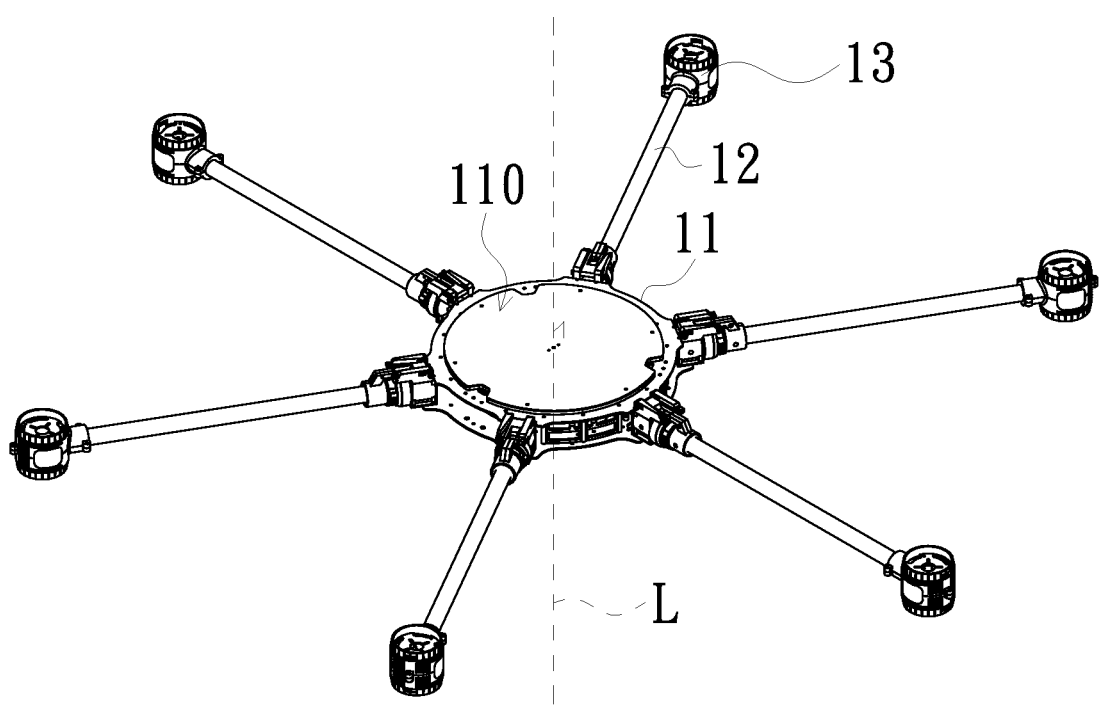
FIG. 1 is a schematic view showing the appearance of a structure of a flight device in an unfolded state in accordance with an embodiment of the invention.
Figure 2:
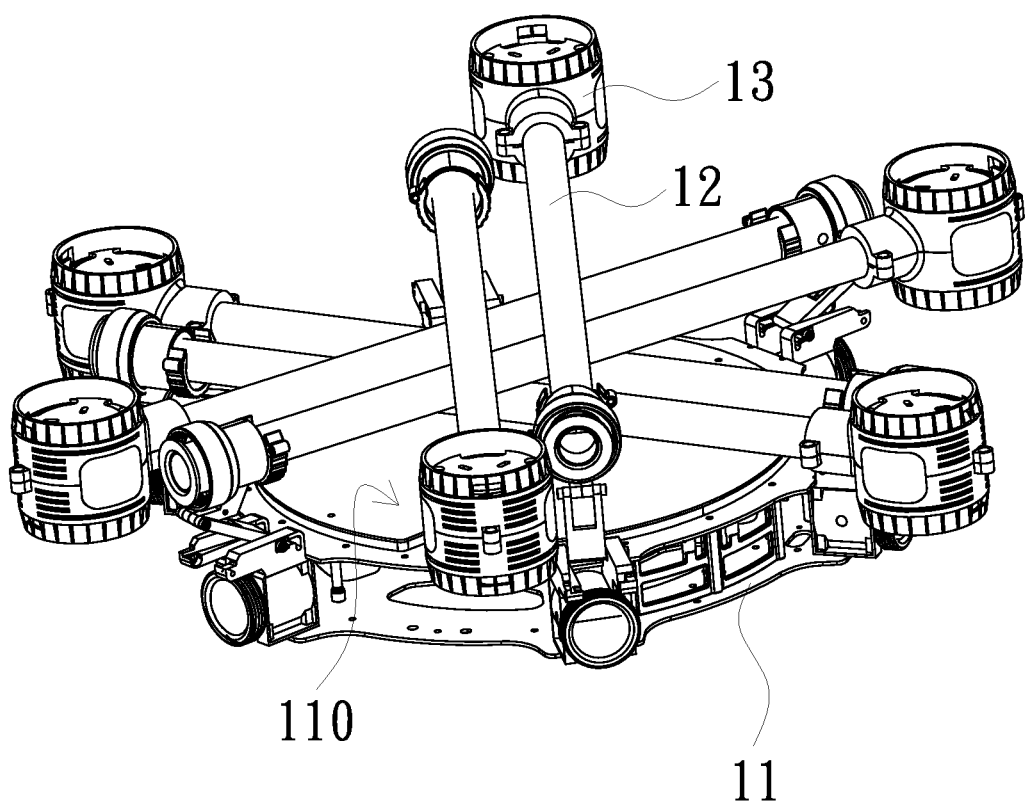
FIG. 2 is a schematic view showing the appearance of a structure of a flight device in a folded state in accordance with an embodiment of the invention.

Please refer to FIGS. 1 and 2. FIG. 1 is a schematic view showing the appearance of a structure of a flight device in an unfolded state in accordance with an embodiment of the invention. FIG. 2 is a schematic view showing the appearance of a structure of a flight device in a folded state in accordance with an embodiment of the invention. As shown in FIGS. 1 and 2, the flight device 1 of the embodiment includes a device body 11, a plurality of arm structures 12 and a plurality of rotor modules 13. The device body 11 has a surface 110. The surface 110 may be a bearing surface, and through which the device body 11 may carry an object, but the invention is not limited thereto. These arm structures 12 are disposed on the side surfaces of the device body 11, respectively. These rotor modules 13 are disposed at end parts of these arm structures 12, respectively. In the embodiment, the number of the arm structures 12 and the number of the rotor modules 13 are six respectively, but the invention is not limited thereto. These arm structures 12 are, for example, arm structures that are symmetrical to each other. In addition, in the embodiment, the surface 110 of the device body 11 is, for example, circular, but the invention is not limited thereto. These arm structures 12 are disposed to the device body 11 in an evenly distributed manner and around the surface 110. Namely, the six arm structures 12 are divided into three sets of arm structures opposite each other.

The detailed structure of the arm structure 12 of the embodiment will be further described below.

Figure 3:
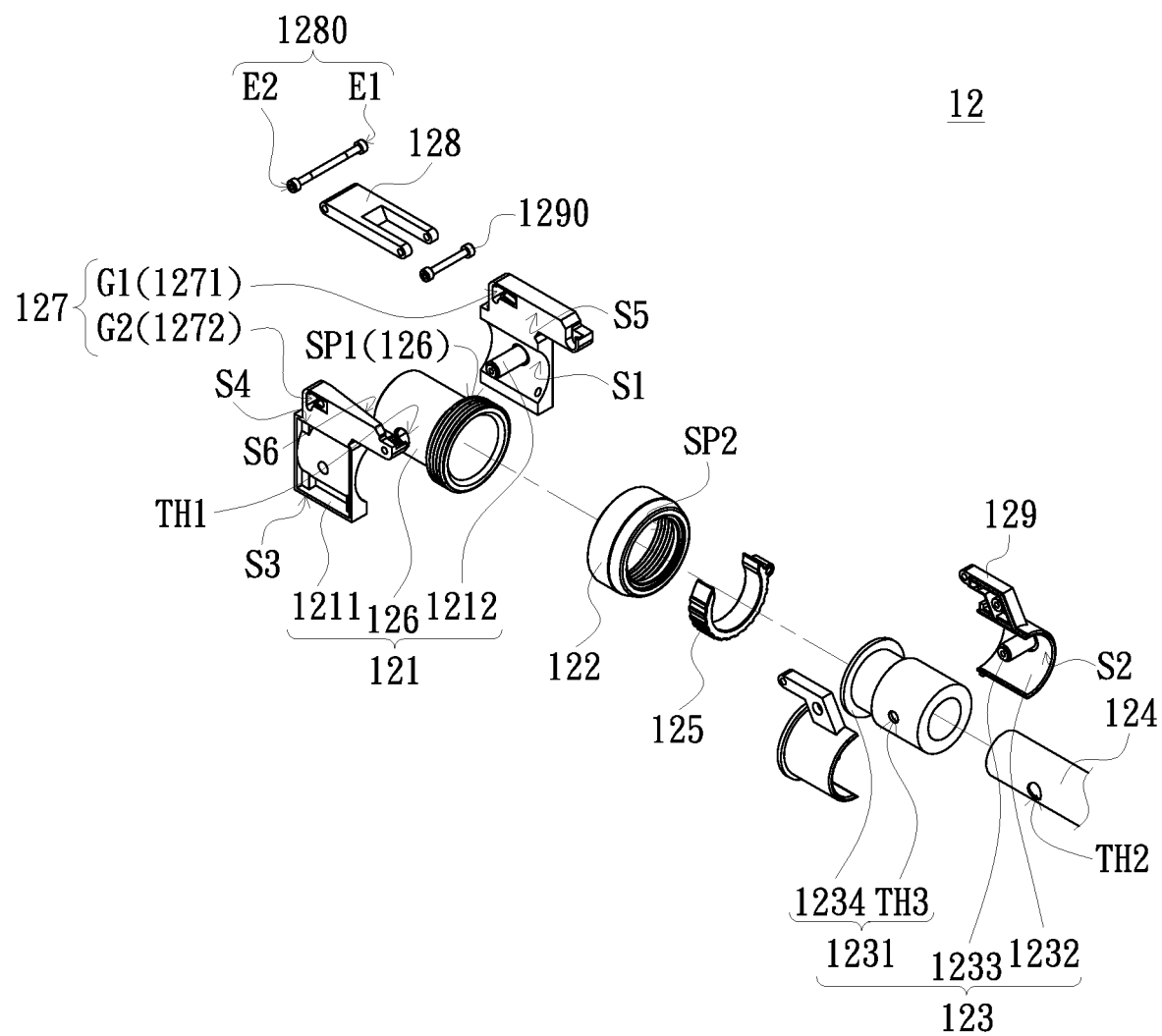
FIG. 3 is an exploded perspective view of the components of an arm structure in accordance with an embodiment of the invention.
Figure 4:
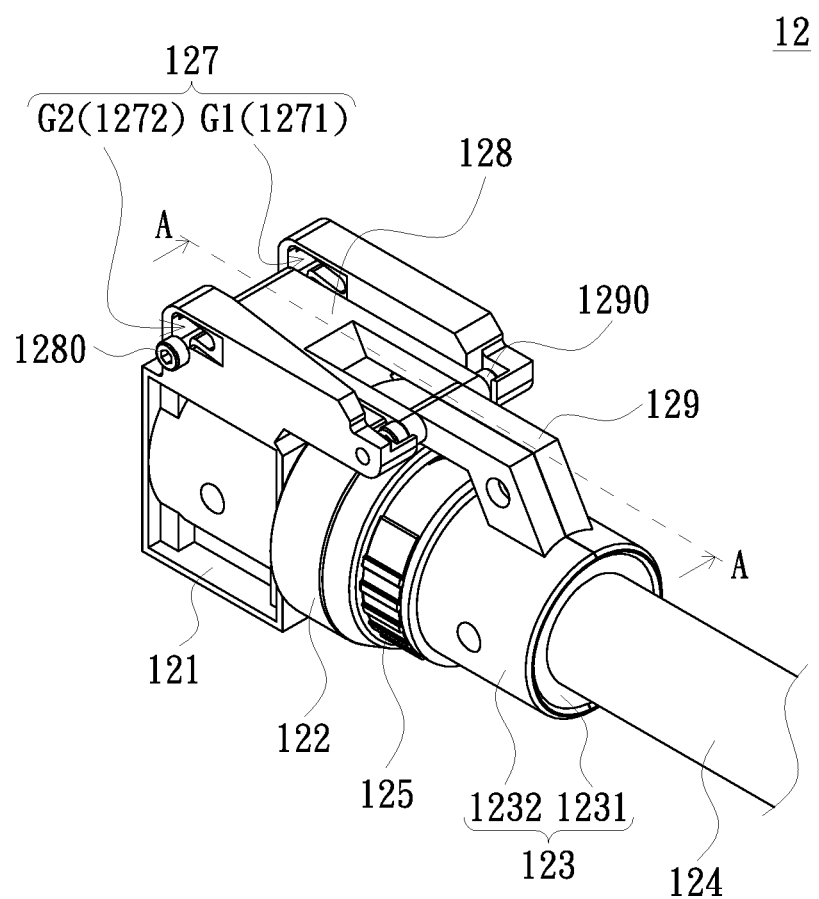
FIG. 4 is a schematic view of the assembled components of the arm structure shown in FIG. 3.
Figure 5:
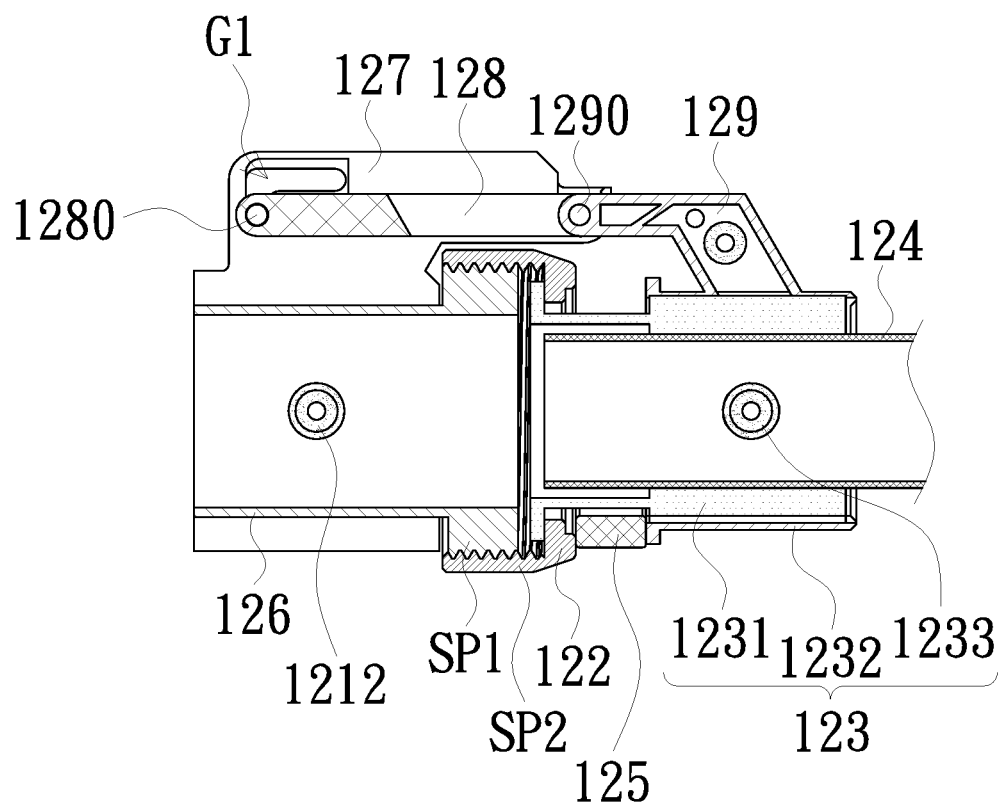
FIG. 5 is a cross-sectional view taken along line A-A of FIG. 4.

Please refer to FIGS. 3-5. FIG. 3 is an exploded perspective view of the components of the arm structure 12 in accordance with an embodiment of the invention. FIG. 4 is a schematic view of the assembled components of the arm structure 12 shown in FIG. 3. FIG. 5 is a cross-sectional view taken along line A-A of FIG. 4. As shown in FIGS. 3-5, each arm structure 12 of the embodiment includes a fixing base 121 including a first screw element 126, a second screw element 122, a connecting unit 123, a rod body 124 and a position-limiting element 125. The fixing base 121 is disposed in the device body 11. The first screw element 126 has a first screw part SP1. The second screw element 122 has a second screw part SP2 which is matched with the first screw part SP1. In the embodiment, the first screw element 126 and the second screw element 122 are, for example, a hollow cylindrical structure, but the invention is not limited thereto. The connecting unit 123 drills through the second screw element 122. By screwing (screw thread screwing) the first screw part SP1 of the first screw element 126 and the second screw part SP2 of the second screw element 122 with each other, the connecting unit 123 is screwed to the fixing base 121. The rod body 124 drills through the connecting unit 123. The position-limiting element 125 is detachably disposed between the second screw element 122 and the connecting unit 123, and the position-limiting element 125 abuts against the second screw element 122. In the embodiment, the position-limiting element 125 is, for example, a ring-like structure and annularly disposed between the second screw element 122 and the connecting unit 123, but the invention is not limited thereto.

It is to be noted that the position-limiting element 125 is effective in when the first screw part SP1 of the first screw element 126 and the second screw part SP2 of the second screw element 122 are screwed with each other, by abutting the position-limiting element 125 annularly disposed between the second screw element 122 and the connecting unit 123 against the second screw element 122, the first screw part SP1 and the second screw part SP2 screwed together are effectively prevented from disengaging from each other due to vibration. When desiring to fold the arm structure 12, it is only required to disassemble the position-limiting element 125 and then disengage the first screw part SP1 of the first screw element 126 and the second screw part SP2 of the second screw element 122 from each other.

Please continue to refer to FIGS. 3-5. The fixing base 121 of the embodiment further includes a first housing 1211 and a first alignment rod 1212. The first screw element 126 is disposed in the first housing 1211, and the first screw part SP1 of the first screw element 126 is protruded out of the first housing 1211. The first alignment rod 1212 is disposed in the first housing 1211. Specifically, the first alignment rod 1212 is disposed on an inner surface S1 of the first housing 1211. The first screw element 126 of the embodiment further has at least one first through hole TH1. In the embodiment, the number of the first through holes TH1 is, for example, two, and the two first through holes TH1 are opposite to each other. When the first screw element 126 is disposed in the first housing 1211, the first alignment rod 1212 located on the inner surface S1 of the first housing 1211 passes through the first through holes TH1 of the first screw element 126 so that the first screw element 126 is securely fixed in the first housing 1211.

It is to be noted that the fixing base 121 of the embodiment is composed of the first screw element 126, the first housing 1211 and the first alignment rod 1212. In one embodiment, the first screw element 126 and the first housing 1211 are two individual components which are separated from each other. In other embodiments, the first screw element 126, the first housing 1211 and the first alignment rod 1212 are, for example, an integrally-formed structure. The advantage that the first screw element 126, the first housing 1211 and the first alignment rod 1212 are an integrally-formed structure is that the number of components can be reduced, the assembly complexity is simplified, and the working time and production cost are effectively reduced.

Please continue to refer to FIGS. 3-5. The connecting unit 123 of the embodiment includes a connecting member 1231, a second housing 1232 and a second alignment rod 1233. The connecting member 1231 is disposed between the second screw element 122 and the rod body 124. The connecting member 1231 includes at least one third through hole TH3 and an abutment part 1234. When the connecting unit 123 drills through the second screw member 122, the abutment part 1234 of the connecting member 1231 abuts against the second screw member 122. In the embodiment, the number of the third through holes TH3 is, for example, two, and the two third through holes TH3 are opposite to each other. The connecting member 1231 and part of the rod body 124 are located in the second housing 1232, and the abutment part 1234 of the connecting member 1231 is protruded out of the second housing 1232. The second alignment rod 1233 is disposed in the second housing 1232. Specifically, the second alignment rod 1233 is disposed on an inner surface S2 of the second housing 1232. The rod body 124 of the embodiment includes a second through hole TH2. In the embodiment, the number of the second through holes TH2 is, for example, two, and the two second through holes TH2 are opposite to each other. When the rod body 124 drills through the connecting unit 123, the second through hole TH2 of the rod body 124 and the third through hole TH3 of the connecting member 1231 are overlapped with each other and the second alignment rod 1233 passes through these second through holes TH2 and third through holes TH3, so that the rod body 124 is fixed to the connecting member 1231.

It is to be noted that the connecting unit 123 of the embodiment is composed of the connecting member 1231, the second housing 1232 and the second alignment rod 1233. In one embodiment, the connecting member 1231 and the second housing 1232 are two individual components which are separated from each other. In other embodiments, the connecting member 1231, the second housing 1232 and the second alignment rod 1233 are, for example, an integrally-formed structure. The advantage that the connecting member 1231, the second housing 1232 and the second alignment rod 1233 are an integrally-formed structure is that the number of components can be reduced, the assembly complexity is simplified, and the working time and production cost are effectively reduced.

Please continue to refer to FIGS. 3-5. The arm structure 12 of the embodiment further includes a position-limiting structure 127, a first sub-arm 128 and a second sub-arm 129. The position-limiting structure 127 is disposed on the fixing base 121. Specifically, the fixing base 121 has a bottom surface S3 and a top surface S4 opposite to each other. The bottom surface S3 of the fixing base 121 is engaged with the device body 11, and the position-limiting structure 127 is disposed on the top surface S4 of the fixing base 121. The first sub-arm 128 is pivotally connected to the position-limiting structure 127 by a first pivot shaft 1280, and the first sub-arm 128 is rotated about the first pivot shaft 1280 as a rotation axis. The second sub-arm 129 is disposed at the connecting unit 123 and pivotally connected to the first sub-arm 128 by a second pivot shaft 1290, and the second sub-arm 129 is rotated about the second pivot shaft 1290 as a rotation axis. Specifically, the second sub-arm 129 is rotated about the second pivot shaft 1290 as a rotation axis in a direction toward or away from the device body 11, thereby driving the arm structure 12 to rotate in a direction toward or away from the device body 11. It is to be noted that when the first sub-arm 128 and the second sub-arm 129 are simultaneously rotated about the first pivot shaft 1280 and the second pivot shaft 1290 respectively, the first sub-arm 128 and the second sub-arm 129 drive the arm structure 12 to move in a direction perpendicular to the surface 110 of the device body 11. The details of how the first sub-arm 128, the second sub-arm 129, the first pivot shaft 1280 and the second pivot shaft 1290 are actuated will be described later.

As shown in FIGS. 3-5, the position-limiting structure 127 of the embodiment includes a first plate body 1271 and a second plate body 1272 opposite to each other. The first plate body 1271 has a first slide groove G1 and the second plate body 1272 has a second slide groove G2. In the embodiment, the first pivot shaft 1280 includes a first end part E1 and a second end part E2 opposite to each other. The first end part E1 of the first pivot shaft 1280 is located in the first slide groove G1 of the first plate body 1271, and the first end part El of the first pivot shaft 1280 is moved along the first slide groove G1. The second end part E2 of the first pivot shaft 1280 is located in the second slide groove G2 of the second plate body 1272, and the second end part E2 of the first pivot shaft 1280 is moved along the second slide groove G2.

Figure 6:
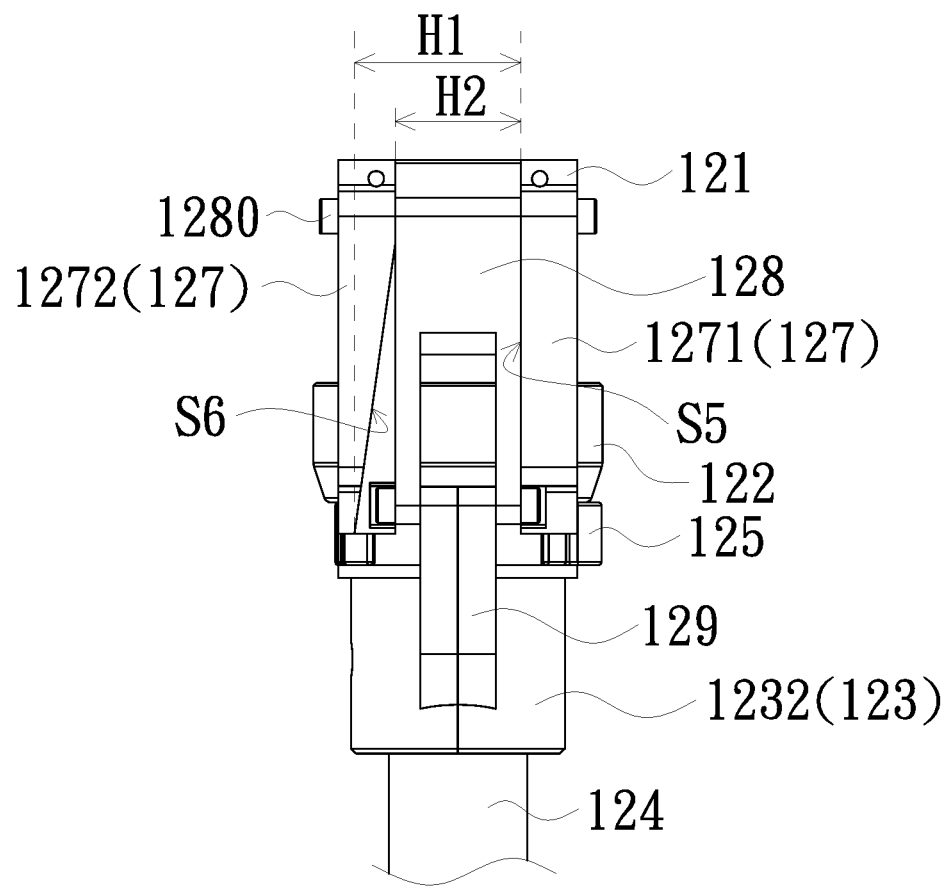
FIG. 6 is a schematic top view of the arm structure shown in FIG. 4.

Please refer to FIG. 6, which is a schematic top view of the arm structure 12 shown in FIG. 4. In the embodiment, a gap H1 is formed between the inner surfaces of first plate body 1271 and the second plate body 1272, and the gap H1 is larger than the width H2 of the first sub-arm 128. Specifically, the first plate body 1271 has an inner side surface S5, and the second plate body 1272 has an inner side surface S6 opposite to the inner side surface S5. In the embodiment, the inner side surface S6 of the second plate body 1272 is, for example, an inclined plane inclined in a direction away from the inner side surface S5. Because the inner side surface S6 of the second plate body 1272 is inclined in a direction away from the inner side surface S5, the gap H1 between the first plate body 1271 and the second plate body 1272 is larger than the width H2 of the first sub-arm 128.

Figure 7A:
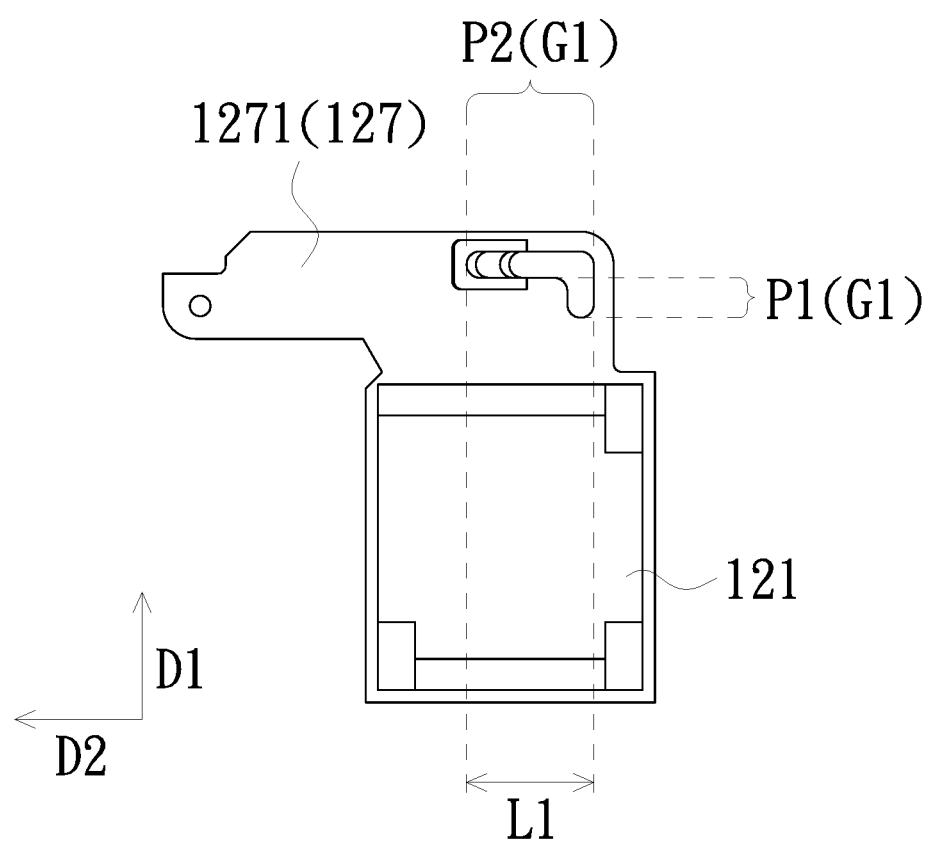
FIG. 7A is a schematic partial side view of FIG. 4.
Figure 7B:
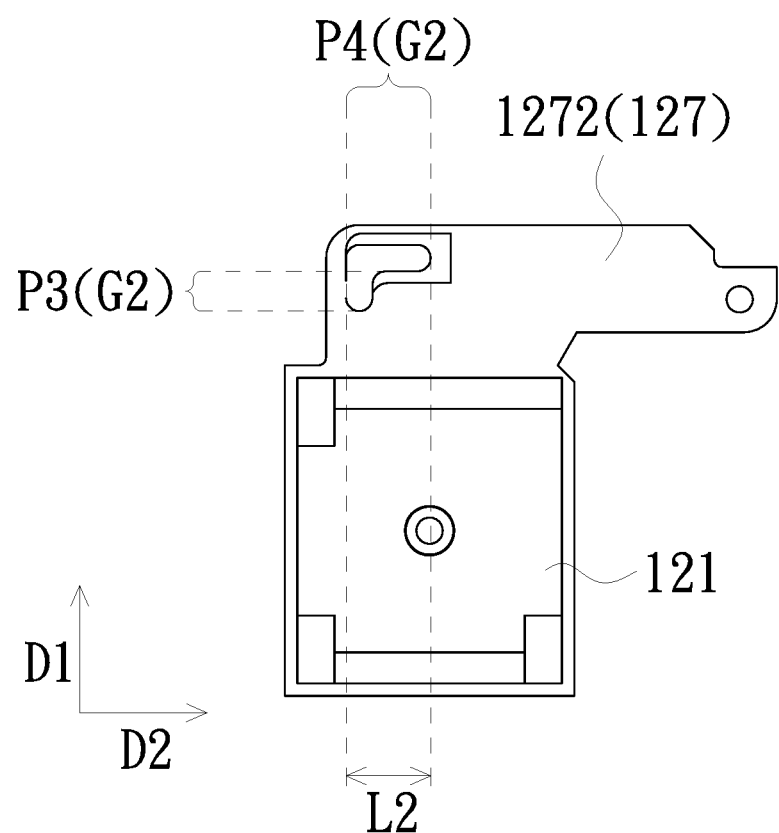
FIG. 7B is a schematic partial side view of FIG. 4 from another viewing angle.

Please refer to FIGS. 7A and 7B. FIG. 7A is a schematic partial side view of FIG. 4. FIG. 7B is a schematic partial side view of FIG. 4 from another viewing angle. As shown in FIG. 7A, the first slide groove G1 of the embodiment includes a first portion P1 and a second portion P2 connected to each other. The first portion P1 of the first slide groove G1 extends in a first direction D1 perpendicular to the surface 110 (shown in FIG. 1). The second portion P2 of the first slide groove G1 extends in a second direction D2 parallel to the surface 110. As shown in FIG. 7B, the second slide groove G2 of the embodiment includes a third portion P3 and a fourth portion P4 connected to each other. The third portion P3 of the second slide groove G2 extends in the first direction D1, and the third portion P3 and the first portion P1 are opposite to each other. The fourth portion P4 of the second slide groove G2 extends in the second direction D2, and the fourth portion P4 and the second portion P2 are opposite to each other.

Please continue to refer to FIGS. 7A and 7B. The second portion P2 of the first slide groove G1 of the embodiment extends to have a first extension amount L1. The fourth portion P4 of the second slide groove G2 extends in the second direction D2 to have a second extension amount L2, and the first extension amount L1 of the second portion P2 of the first slide groove G1 and the second extension amount L2 of the fourth portion P4 of the second slide groove G2 are not equal to each other. In the embodiment, the first extension amount L1 is, for example, larger than the second extension amount L2, but the invention is not limited thereto. Specifically, when the first end part E1 and the second end part E2 of the first pivot shaft 1280 are moved in the second portion P2 of the first slide groove G1 and the fourth portion P4 of the second slide groove G2 respectively, because the first extension amount L1 of the second portion P2 of the first slide groove G1 is larger than the second extension amount L2 of the fourth portion P4 of the second slide groove G2, the moving distance the first end part E1 of the first pivot shaft 1280 in the first slide groove G1 is larger than the moving distance of the second end part E2 of the first pivot shaft 1280 in the second slide groove G2.

According to the above description, it is known that by the structural design of the position-limiting structure 127 in the embodiment, the first sub-arm 128 can be rotated about a reference axis L (shown in FIG. 1) perpendicular to the surface 110 as a rotation axis and within the gap H1 between the first plate body 1271 and the second plate body 1272. It is to be noted that in the embodiment shown in FIGS. 7A and 7B, by the structural design of the first extension amount L1 of the second portion P2 of the first slide groove G1 and the second extension amount L2 of the fourth portion P4 of the second slide groove G2 not equal to each other, the first sub-arm 128 can be rotated about the reference axis L as a rotation axis and within the gap H1 between the first plate body 1271 and the second plate body 1272, but the invention is not limited thereto. In other embodiments, bumps (not shown) may be disposed at the second portion P2 of the first slide groove G1 or at the fourth portion P4 of the second slide groove G2 to limit the position of the first pivot shaft 1280 in the position-limiting structure 127, thereby avoiding the unnecessary sliding of the first pivot shaft 1280.

Figure 8A:
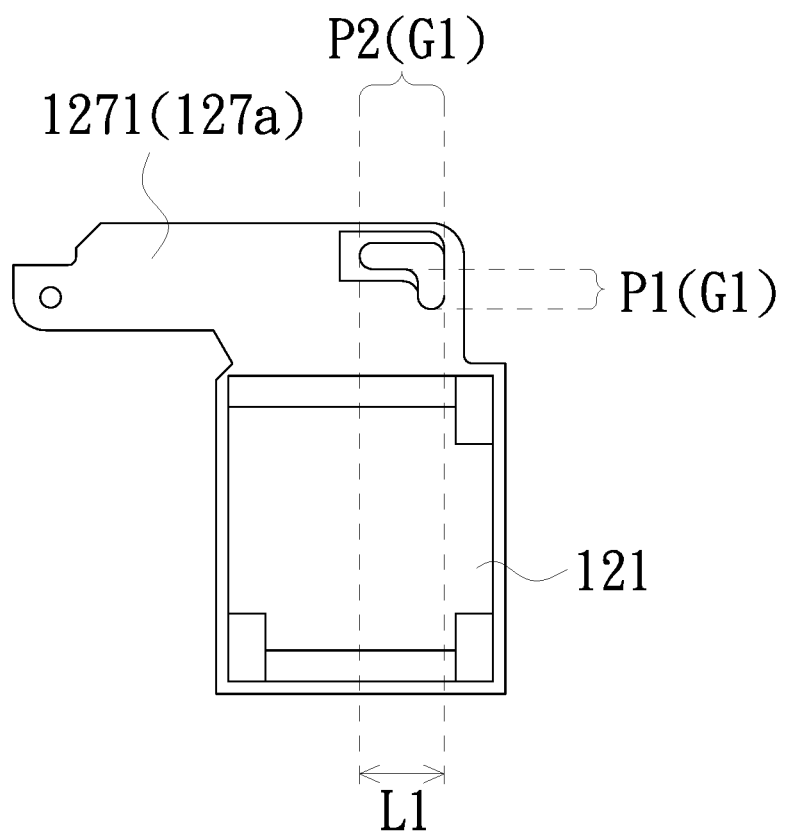
FIG. 8A is a schematic side view of the first slide groove of the position-limiting structure in accordance with another embodiment of the invention.
Figure 8B:
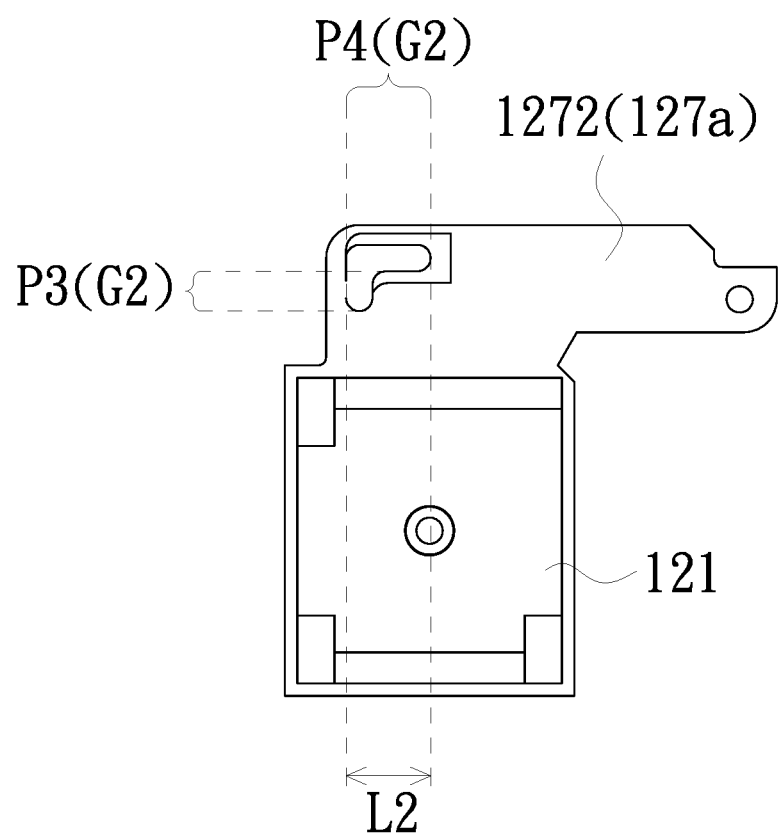
FIG. 8B is a schematic side view of the second slide groove of the position-limiting structure in accordance with another embodiment of the invention.

In other embodiments as shown in FIGS. 8A and 8B, the first extension amount L1 of the second portion P2 of the first slide groove G1 of the position-limiting structure 127a is equal to, for example, the second extension amount L2 of the fourth portion P4 of the second slide groove G2. By this structural design, the first sub-arm 128 can also be rotated about the reference axis L as a rotation axis and within the gap H1 between the first plate body 1271 and the second plate body 1272. For example, the first end part E1 of the first pivot shaft 1280 is engaged to the first portion P1 of the first slide groove G1, and the second end part E2 of the first pivot shaft 1280 is disengaged from the third portion P3 of the second slide groove G2 and moved in the fourth portion P4. Because the first end part E1 of the first pivot shaft 1280 is fixed in the first slide groove G1 without moving and the second end part E2 is moved in the second slide groove G2, the first sub-arm 128 is driven to rotate about the reference axis L perpendicular to the surface 110 as a rotation axis.

Figure 9A:
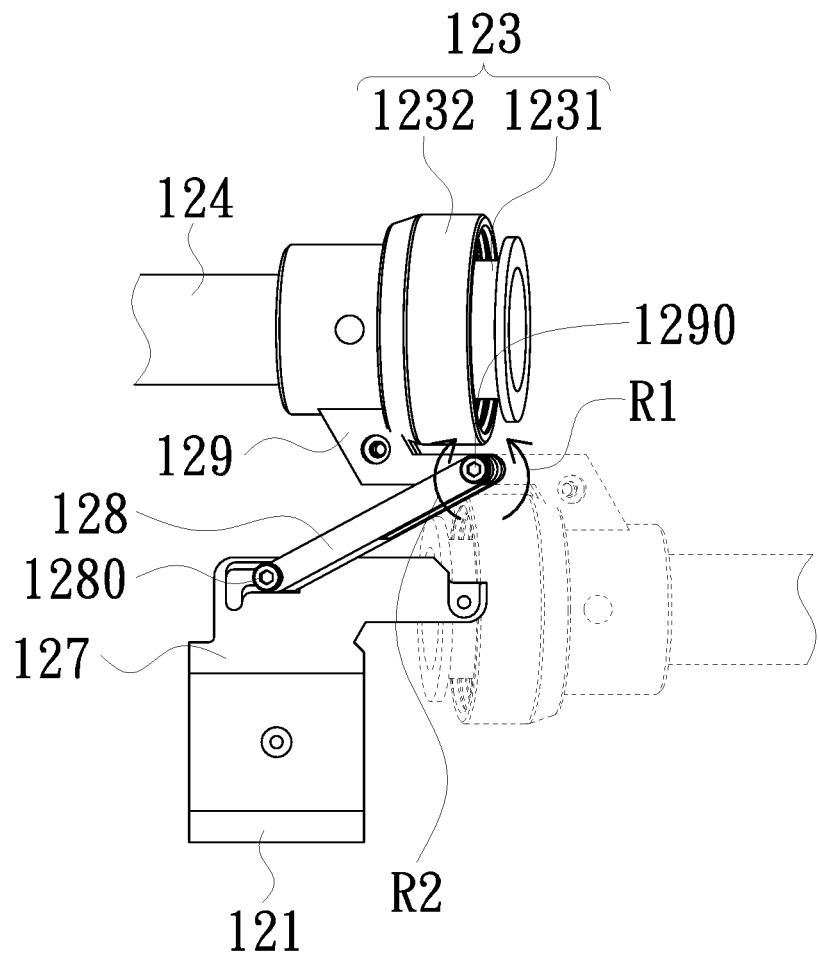
FIG. 9A is a schematic view showing the rotation of the arm structure between an unfolded state and a folded state.
Figure 9B:
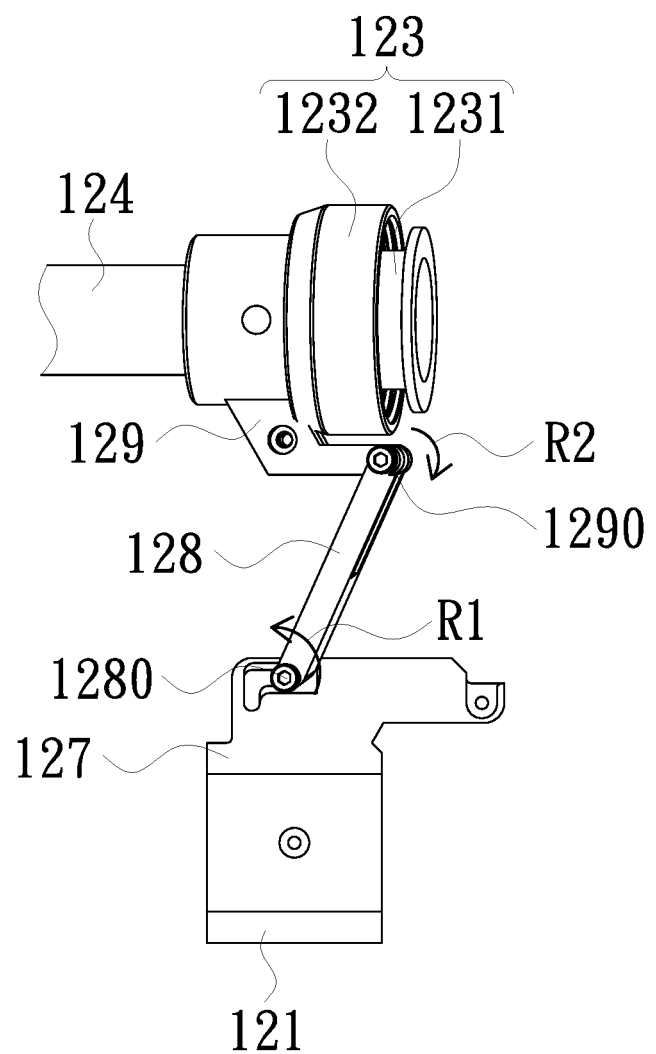
FIG. 9B is a schematic view showing the moving up and down of the arm structure.
Figure 9C:
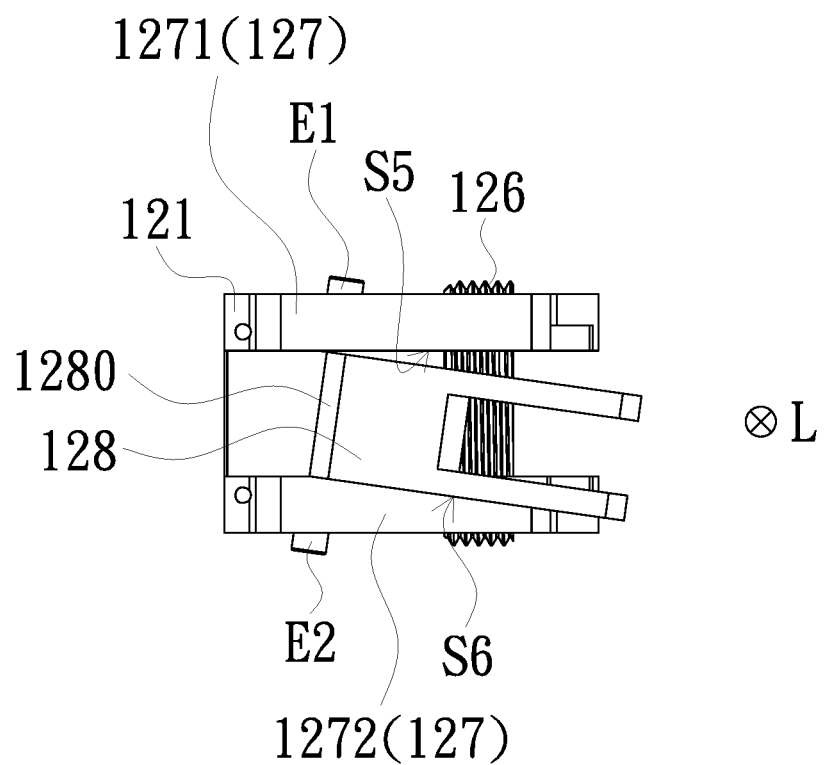
FIG. 9C is a schematic view showing the traverse of the arm structure in the position-limiting structure.

Please refer to FIGS. 9A-9C. FIG. 9A is a schematic view showing the rotation of the arm structure 12 of the embodiment between an unfolded state and a folded state. FIG. 9B is a schematic view showing the moving up and down of the arm structure 12 of the embodiment. FIG. 9C is a schematic view showing the traverse of the arm structure 12 of the embodiment in the position-limiting structure 127. As shown in FIG. 9A, the second sub-arm 129 is rotated about the second pivot shaft 1290 as a rotation axis. When the arm structure 12 is folded, the second pivot shaft 1290 of the second sub-arm 129 is rotated in a first rotational direction R1 so that the second sub-arm 129 is moved in a direction toward the device body 11 and at the same time the arm structure 12 is driven to move in a direction toward the device body 11. When the arm structure 12 is unfolded, the second pivot shaft 1290 of the second sub-arm 129 is rotated in a second rotational direction R2 opposite to the first rotational direction R1 so that the second sub-arm 129 is moved in a direction away from the device body 11 and at the same time the arm structure 12 is driven to move in a direction away from the device body 11. As shown in FIG. 9B, when the first pivot shaft 1280 of the first sub-arm 128 is rotated in the first rotational direction R1 and at the same time the second pivot shaft 1290 of the second sub-arm 129 is rotated in the second rotational direction R2, the first sub-arm 128 and the second sub-arm 129 drive the arm structure 12 to move up in a direction perpendicular to the surface 110. On the contrary, when the first pivot shaft 1280 of the first sub-arm 128 is rotated in the second rotational direction R2 and at the same time the second pivot shaft 1290 of the second sub-arm 129 is rotated in the first rotational direction R1, the first sub-arm 128 and the second sub-arm 129 drive the arm structure 12 to move down in a direction perpendicular to the surface 110. As shown in FIG. 9C, by the structural design of the first end part E1 of the first pivot shaft 1280 moving in the first slide groove G1, the second end part E2 of the first pivot shaft 1280 moving along the second slide groove G2, and the first extension amount L1 of the second portion P2 of the first slide groove G1 not equal to the second extension amount L2 of the fourth portion P4 of the second slide groove G2, the first sub-arm 128 is rotated about the reference axis L as a rotation axis and within the gap H1 between the first plate body 1271 and the second plate body 1272 and at the same time the arm structure 12 is driven to move in a direction toward the inner surface S6 (an inclined plane) of the second plate body 1272.

It is to be noted that because the arm structures 12 of the embodiment are three sets of opposing arm structures 12, the arm structures 12 may collide with each other when the arm structures 12 are folded. Therefore, by the structural characteristic of the first sub-arm 128 rotating about the reference axis L as a rotation axis and within the gap H1 between the first plate body 1271 and the second plate body 1272, these arm structures 12 are effectively prevented from colliding with each other. Further, by utilizing the first sub-arm 128 and the second sub-arm 129 to drive the arm structures 12 to move up or down in a direction perpendicular to the surface 110, these arm structures 12 are able to be parallel to the surface 110 of the device body 11 when stacked on each other.

Figure 10:
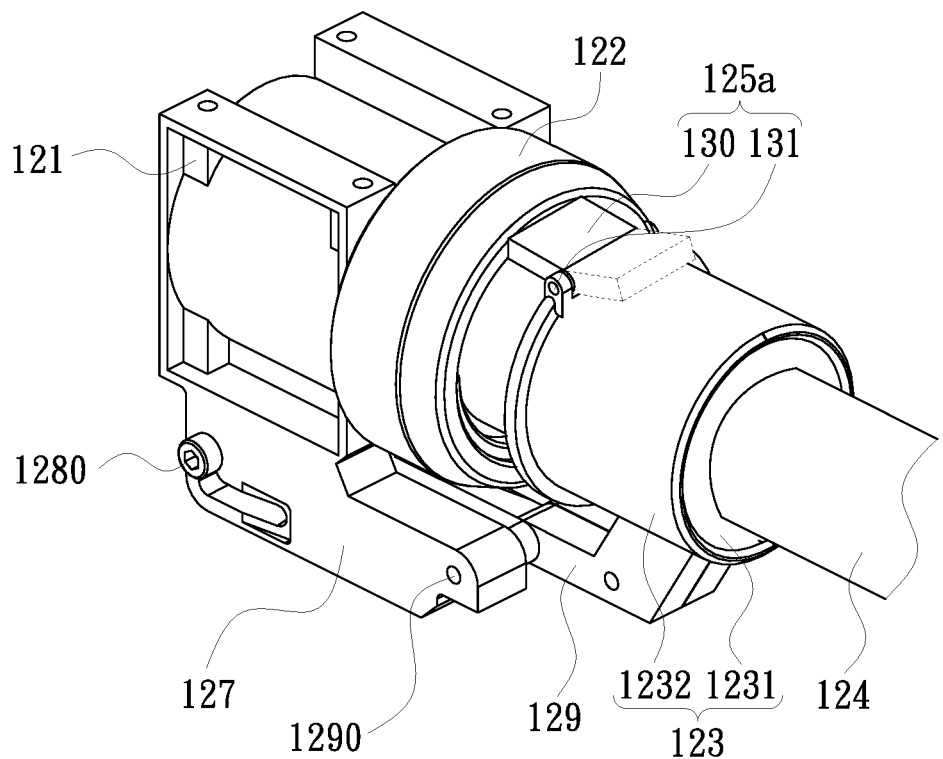
FIG. 10 is a schematic view showing the appearance of the arm structure in accordance with another embodiment of the invention.

Please refer to FIG. 10, which is a schematic view showing the appearance of the arm structure in accordance with another embodiment of the invention. The arm structure 12a of the embodiment is similar to the arm structure 12 shown in FIGS. 3-7B except that the position-limiting element 125a of the embodiment includes an abutment block 130 and a pivot shaft 131. The abutment block 130 is disposed between the second screw element 122 and the connecting unit 123. The pivot shaft 131 is disposed at the connecting unit 123 and pivotally connected to the abutment block 130, and the abutment block 130 is rotated about the pivot shaft 131 as a rotation axis. When the first screw part SP1 of the first screw element 126 and the second screw part SP2 of the second screw element 122 are screwed with each other, by rotating the abutment block 130 to between the second screw element 122 and the connecting unit 123 and abutting the abutment block 130 against the second screw element 122, the first screw part SP1 and the second screw part SP2 screwed together are effectively prevented from disengaging from each other due to vibration. When desiring to fold the arm structure 12a, it is only required to rotate the abutment block 130 to not abut against the second screw element 122 and then disengage the first screw part SP1 of the first screw element 126 and the second screw part SP2 of the second screw element 122 from each other.

In summary, by locking the screw parts of the screw elements (for example, the first and second screw elements) to generate a frictional force upon locking, the flight device of the embodiment of the invention has a strong tensile strength, shear strength and fatigue strength. In addition, by utilizing the position-limiting element to fix the screw elements tightly screwed with each other, the arm structure of the flight device of the embodiment of the invention has a structure with some advantages such as less liable to slide and high tightening stability. Further, through the arm structure actuated by the position-limiting structure, the first sub-arm and the second sub-arm pivotally connected to each other, the flight device of the embodiment of the invention is easily switched from the unfolded state to the folded state and the volume of the flight device in the folded state is effectively reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A flight device, comprising:
   a device body having a surface;
   a plurality of arm structures disposed in the device body respectively, and each of the plurality of arm structures comprising:
   a fixing base disposed in the device body, wherein the fixing base comprises a first screw element, and the first screw element has a first screw part;
   a second screw element having a second screw part matched with the first screw part;
   a connecting unit mounted through the second screw element, wherein the first screw part and the second screw part are threaded with each other, and the connecting unit is locked with the fixing base;
   a rod body mounted through the connecting unit; and
   a position-limiting element disposed between the second screw element and the connecting unit, wherein the position-limiting element abuts against the second screw element, the rod body comprises at least one second through hole, and the connecting unit comprises:
   a connecting member disposed between the second screw element and the rod body, wherein the connecting member comprises at least one third through hole and an abutment part, when the connecting unit is mounted through the second screw element, the abutment part of the connecting member abuts against an inner wall of the second screw element:
a second housing, wherein the connecting member and part of the rod body are located in the second housing, and the abutment part of the connecting member protrudes out form the second housing; and
a second alingment rod disposed in the second housing, wherein when the rod body is mounted through the connecting unit, the second through hole and the third through hole are overlapped with each other, and the second alignment rod passes through the at least one second through hole and the at least one third through hole to fix the rod body to the connecting member; and
a plurality of rotor modules disposed to the plurality of arm structures respectively.

2. The flight device according to claim 1, wherein the first screw element has at least one first through hole, and the fixing base further comprises:
a first housing, wherein the first screw element is disposed in the first housing, and the first screw part of the first screw element protrudes out from the first housing; and
a first alignment rod disposed in the first housing, wherein the first alignment rod passes through the at least one first through hole of the first screw element thereby fixing the first screw element in the first housing.

3. The flight device according to claim 2, wherein the first screw element, the first housing and the first alignment rod are an integrally-formed structure.

4. The flight device according to claim 1, wherein the connecting member, the second housing and the second alignment rod are an integrally-formed structure.

5. The flight device according to claim 1, wherein the position-limiting element is a ring-like structure and annularly disposed between the second screw element and the connecting unit.

6. A flight device, comprising:
a device body having a surface;
a plurality of arm structures disposed in the device body respectively, and each of the plurality of arm structures comprising:
a fixing base disposed in the device body, wherein the fixing base commprises a first screw element, and the first screw element has a first screw part;
a second screw element having a second screew part matches with the first screw part;
a connecting unit mounted through the second screw element, wherein the first screw part and the second screw part are threaded with each other, and the connecting unit is locked with the fixing base;
a rod body mounted through the connecting unit; and
a position-limiting element disposed between the second screw element and the connecting unit, wherein the position-limiting element abuts against the second screw elment, the position-limiting element comprises:
an abutment block disposed between the second screw element and the connecting unit; and
a pivot shaft disposed at the connecting unit and pivotally connected to the abutment block, wherein the abutment block is rotatable about the pivot shaft as a rotation axis; and
a plurality of rotor modules disposed to the plurality of arm structures respectively.

7. The flight device according to claim 1, wherein each of the plurality of arm structures further comprises:
a position-limiting structure disposed on the fixing base;
a first sub-arm pivotally connected to the position-limiting structure by a first pivot shaft, wherein the first sub-arm is rotatable about the first pivot shaft as a rotation axis; and
a second sub-arm disposed at the connecting unit and pivotally connected to the first sub-arm by a second pivot shaft, wherein the second sub-arm is rotatable about the second pivot shaft as a rotation axis.

8. The flight device according to claim 7, wherein the position-limiting structure comprises a first plate body and a second plate body opposite to each other, the first plate body has a first slide groove, the second plate body has a second slide groove, the first pivot shaft comprises a first end part and a second end part opposite to each other, the first end part is located in the first slide groove and is movable along the first slide groove, and the second end part is located in the second slide groove and is movable along the second slide groove.

9. The flight device according to claim 8, wherein a gap is formed between the first plate body and the second plate body, and the gap is larger than a width of the first sub-arm.

10. The flight device according to claim 8, wherein the first slide groove comprises a first portion and a second portion connected to each other, the first portion extends in a first direction perpendicular to the surface, the second portion extends in a second direction parallel to the surface, the second slide groove comprises a third portion and a fourth portion connected to each other, the third portion extends in the first direction and is opposite to the first portion of the first slide groove, and the fourth portion extends in the second direction and is opposite to the second portion of the second slide groove.

11. The flight device according to claim 10, wherein the second portion of the first slide groove is extendable in the second direction by a first extension amount, the fourth portion of the second slide groove is extendable in the second direction by a second extension amount, and the first extension amount and the second extension amount are not equal to each other.

12. The flight device according to claim 10, wherein the second portion of the first slide groove is extendable in the second direction by a first extension amount, the fourth portion of the second slide groove is extendable in the second direction by a second extension amount, and the first extension amount and the second extension amount are equal to each other.

* * * * *